US006843972B2

(12) United States Patent  
Klein et al.

(10) Patent No.: US 6,843,972 B2
(45) Date of Patent: Jan. 18, 2005

(54) METHOD FOR PURIFYING TRICHLOROSILANE

(75) Inventors: Stephan Klein, Mettmann (DE); Hans-Dieter Block, Leverkusen (DE); Hans-Joachim Leimkühler, Leverkusen (DE); Werner Dick, Leverkusen (DE); Johannes-Peter Schäfer, Kürten (DE)

(73) Assignee: Solarworld Aktiengesellschaft, Bonn (DE)

( * ) Notice: Subject to any disclaimer, the term of this patent is extended or adjusted under 35 U.S.C. 154(b) by 0 days.

(21) Appl. No.: 10/416,829
(22) PCT Filed: Nov. 6, 2001
(86) PCT No.: PCT/EP01/12805
    § 371 (c)(1),
    (2), (4) Date: May 14, 2003
(87) PCT Pub. No.: WO02/40401
    PCT Pub. Date: May 23, 2002

(65) Prior Publication Data
    US 2004/0028594 A1 Feb. 12, 2004

(30) Foreign Application Priority Data
    Nov. 20, 2000 (DE) .......................... 100 57 482

(51) Int. Cl.$^7$ .................................. A62D 3/00
(52) U.S. Cl. ................................... 423/240 S
(58) Field of Search ................ 423/240 S, 240 R, 423/241; 588/248

(56) References Cited

U.S. PATENT DOCUMENTS

| 2,877,097 A | | 3/1959 | Wolff |
| 3,414,603 A | | 12/1968 | Mlavsky |
| 4,113,845 A | * | 9/1978 | Litteral ................... 423/342 |
| 4,224,040 A | | 9/1980 | Gazzarrini et al. |
| 4,701,430 A | | 10/1987 | Jung et al. |
| 5,026,533 A | | 6/1991 | Matthes et al. |

FOREIGN PATENT DOCUMENTS

| DE | 1 134 973 | 4/1963 |
| DE | 1 289 834 | 2/1969 |
| DE | 2 162 537 | 7/1972 |
| DE | 25 07 864 | 8/1975 |
| EP | 0 107 784 | 5/1984 |
| EP | 0 285 937 | 10/1988 |

OTHER PUBLICATIONS

K. Y. Li and C. D. Huang, 1988, no month, Redistribution Reaction of Trichlorosilane in a Fixed–Bed Reactor, Ind. Eng. Chem. Res., 27, 1600–1606.

* cited by examiner

Primary Examiner—Steven Bos
Assistant Examiner—Edward M. Johnson
(74) Attorney, Agent, or Firm—McGlew and Tuttle, P.C.

(57) ABSTRACT

The invention relates to a method for removing anhydrous acids and hydrohalogens from trichlorosilane by contacting the trichlorosilane with solid bases. The invention further relates to the use of the trichlorosilane so purified in the production of silane and/or super-pure silicon.

13 Claims, No Drawings

METHOD FOR PURIFYING TRICHLOROSILANE

The present invention relates to a method for the manufacture of silane and super-pure silicon.

Trichlorosilane $HSiCl_3$ is a valuable intermediate product for producing high-purity silicon, dichlorosilane $H_2SiCl_2$, silane $SiH_4$ and bonding agents. Particularly where trichlorosilane is to be used for the manufacture of super-pure silicon or super-pure silane it needs to be possibly free of any contamination as such contamination could otherwise be dragged into the product.

It is already known that ion exchangers working with $-NR_3$-groups to separate boron trichloride $BCl_3$ from silicon tetrachloride $SiCl_4$ are suitable (U.S. Pat. No. 2,877,097). Apart from this, chlorosilanes are conducted across fine, active, hydrogenous silicic acid to liberate them from boron compounds (DE 1 134 973 C3).

In DE 2 162 537 A1 the production of disproportionating products of chlorosilane compounds, e.g. trichlorosilane, is specified, wherein the chlorosilanes compounds are contacted with an ion exchanger resin in a fixed bed containing bound tertiary amino groups or quaternary ammonium groups. The ion exchanger resin acts as catalyst for the disproportion reaction. The efficiency of the catalysed disproportionation may be affected by anhydrous acids which may be contained in the chlorosilanes compound to be disproportionated in the form of halogenides and hydrides, e.g. $BCl_3$, $BH_3$ and HCl.

DE 1 289 834 A teaches the purification of trichlorosilane of $BCl_3$ by it being contacted with a for example basic adsorbent which is applied to a substrate.

EP 0 107 784 A describes a method for the purification of trichlorosilane from boron-containing impurities. To this end, trichlorosilane vapor is passed through a bed of silica.

So the object of the present invention was to provide a simple and effective method for the manufacture of silane and/or super-pure silicon, wherein trichlorosilane is liberated from anhydrous acids in the form of halogenides and hydrides, wherein the purified trichlorosilane occurs in a form enabling a directly subsequent disproportionation and wherein the method is suitable as a partial step of a continuous procedure for the manufacture of super-pure silane and/or super-pure silicon on the basis of metallurgical silicon.

The object is achieved by a method for removing anhydrous acids and hydrohalogens from trichlorosilane, characterised in that trichlorosilane is contacted with solid bases.

Anhydrous acids in trichlorosilane are, for example, halogenides, such as chloride, and hydrides of elements of the $3^{rd}$, $4^{th}$ and $5^{th}$ main group of the classification of elements, such as B, Al, As, Sb, as well as, in addition to this, the halogenides and hydrides of alloying constituents of the materials used for the apparatuses in which the manufacture or further treatment of the trichlorosilane to be purified is carried out. Such alloying constituents are for example Fe, Ni, Cr, Mo. Particularly HCl should be named as a hydrohalogen.

Suitable solid bases to be contacted with the trichlorosilane to be purified are known. Suitable solid bases are, for example, the compounds specified in DE 2 507 864 A1. Such suitable solids, for example, are solids carrying amino groups or alkyleneamino groups on a structure of polystyrene, cross-linked with divinylbenzole. Suitable amino groups or alkylenamino groups are for example: dimethylamino, diethylamino, ethylmethylamino, di-n-propylamino, di-iso-propylamino, di-2-chlorethylamino, di-2-chlorpropylamino groups and the respectively substituted alkyleneamino groups and the respective hydrochlorides, or the trialkylammonium groups formed from them by methylation, ethylation, propylation, butylation, hydroxyethylation or benzylation with chloride as counterion. Of course, in the case of quaternary ammonia salts or protonised ammonia salts also catalytically active solids with other anions, e.g. hydroxide, sulphate, bi-sulphate, bicarbonate etc. can be introduced into the method according to the invention, a transformation into the chloride form, however, is inevitable under the reaction conditions in the course of time, this applies also to organic hydroxy groups. Therefore, ammonia salts containing chloride as counterion are preferred.

Also those solids are suitable as solid bases which consist of a structure of polyacrylic acid, particularly a polyacrylamide structure, that has bound, for example, trialkylbenzylammonium via an alkyl group.

As a rule, macroporous or mesoporous ion exchangers are more suitable than gel resins. Further suitable solid bases are, for example, solids carrying organic amino groups of the above type, e.g. solids with a 3-dimethyl-aminopropyl-siloxy group, on a solid inorganic structure like silicic acid or zeolite (U.S. Pat. No. 4,701,430). Such suitable solid bases are usually employed in form of beads.

It is possible to treat the solid bases by generally known activation and pretreatment methods, before contacting them with the trichlorosilane to be purified.

Preferably the treatment according to the invention of trichlorosilane with solid bases is carried out in a purifying reactor in which the solid base is provided and through which the trichlorosilane streams.

It is particularly preferred that the purified trichlorosilane be disproportionated in a purifying reactor that is arranged directly downstream of the disproportionation reactor.

In the ideal case the solid base to be employed is identical with the disproportionation catalyst used in a disproportionation reactor that is directly subsequently arranged.

A side-effect of the method according to the invention is that when contacting trichlorosilane with the solid bases specified above by way of example also disproportionation reactions of trichlorosilane to dichlorosilane and silicon tetrachloride occur, simultaneous to the removal of anhydrous acids and hydrohalogens from trichlorosilane, thus reducing the efforts for the execution of a subsequent disproportionation reaction of trichlorosilane to dichlorosilane or silane in subsequent apparatuses.

The specified method can be carried out, for example, in a fixed-bed reactor. It can be carried out, for example, at a pressure from 1 to 50 bar, preferably between 1 and 10 bar. The temperatures can range for example between 0 and 180° C., preferably between 50 and 110° C. The temperature to be adjusted depends on the stability range of the catalytically active solids.

To ensure a continuous operation two or more reactors provided with solid base can be arranged in parallel connection. At regular intervals it can be switched to a reactor provided with fresh solid base in order to ensure the complete removal of anhydrous acids and hydrohalogens from the trichlorosilane to be purified, while the waste solid base is exchanged or regenerated if possible. A reactor can also be executed by a series connection of several reactors.

The method according to the invention can be applied, for example, in processes for the manufacture of dichlorosilane and silane and as a sub-step in processes for the manufacture of hyper-pure silicon from silane.

Preferably the method according to the invention is integrated into a general method for producing silane and/or hyper-pure silicon.

It is particularly preferred that the method according to the invention be integrated into a method for producing silane and/or hyper-pure silicon comprising the following steps:

1. Trichlorosilane synthesis on the basis of silicon, silicon tetrachloride, hydrogen and, if necessary, another chloride source in a fluidised bed reactor under pressure and subsequent isolation of the produced trichlorosilane by distillation and recycling of the unreacted silicon tetrachloride, and, if desired, the unreacted hydrogen.
2. The removal of anhydrous acids and hydrohalogens from trichlorosilane according to the invention by contacting the trichlorosilane with solid bases.
3. Disproportionation of trichlorosilane to silane and silicon tetrachloride through the intermediate stages of dichlorosilane and monochlorosilane on basic catalysts, preferably catalysts containing amino groups, carried out in two apparatuses or in one, and recirculation of the produced silicon coming out as a high-boiling component into the first reaction area.
4. Further use of the silane of the purity given after the preceding step, or purifying the silane until the purity required for the intended purpose is achieved, preferably by distillation, particularly preferred by distillation under pressure.
and, if necessary,
5. Thermal decomposition of silane to obtain high-purity silicon, usually above 500° C.

Apart from thermal decomposition on electrically heated high-purity silicon rods, another suitable method is the thermal decomposition in a fluidised bed consisting of hyper-pure silicon particles, particularly when the production of solar-grade high-purity silicon is desired. To this aim, silane can be mixed with hydrogen and/or inert gases at a mol ratio of 1:0 to 1:10.

What is claimed is:

1. A method for removing anhydrous acids and hydrohalogens from trichlorosilane, wherein:
   trichlorosilane is contacted with a solid base; and
   the solid base used are solids carrying at least one of amino groups and alkyleneamino groups on a structure of polystyrene, cross-linked with divinylbenzole.
2. A method according to claim 1, wherein the amino groupsand alkyleneamino groups used are selected from: dimethylamino, diethylamino, ethylmethylamino, di-n-propylamino, di-iso-propylamino, di-2-chlorethylamino, di-2-chlorpropylamino groups and their respective hydrochlorides, and the trialkylammonium groups formed from them by methylation, ethylation, propylation, butylation, hydroxyethylation or benzylation with chloride as counterion.
3. A method according to claim 1, wherein the solid bases used are solids carrying organic amino groups on a solid inorganic structure.
4. A method according to claim 1, wherein trichlorosilane is contacted with the solid base in one or in several fixed-bed reactors.
5. A method according to claim 1, wherein the reaction is carried out at a pressure ranging from 1 to 50 bar and temperatures ranging from 0 to 180° C.
6. A method according to claim 1, wherein trichlorosilane is contacted with the solid bases in a purifying reactor and the purified trichlorosilane is disproportionated in the presence of a disproportionation catalyst in a disproportionation reactor that as arranged directly downstream of the purifying reactor.
7. A method according to claim 6, wherein the solid base employed is identical with the disproportionation catalyst used.
8. A method for removing anhydrous acids and hydrohalogens from trichlorosilane wherein:
   trichlorosilane is contacted with a solid base; and
   the solid bases used are solids which consist of a structure of polyacrylic acid that has bound trialkylbenzylammonium.
9. A method according to claim 8, wherein the solid bases used are solids carrying organic amino groups on a solid inorganic structure.
10. A method according to claim 8, wherein trichlorosilane is contacted with the solid base in one or in several fixed-bed reactors.
11. A method according to claim 8, wherein the reaction is carried out at a pressure ranging front 1 to 50 bar and temperatures ranging from 0 to 180° C.
12. A method according to claim 8, wherein trichlorosilane is contacted with the solid bases in a purifying reactor and the purified trichlorosilane is disproportionated in the presence of a disproportionation catalyst in a disproportionation reactor that is arranged directly downstream of the purifying reactor.
13. A method according to claim 12, wherein the solid base employed is identical with the disproportionation catalyst used.

* * * * *